United States Patent [19]

Shipley

[11] Patent Number: 5,062,151
[45] Date of Patent: Oct. 29, 1991

[54] COMMUNICATION SYSTEM

[75] Inventor: Robert T. Shipley, Oakland, Calif.

[73] Assignee: Fisher Berkeley Corporation, Oakland, Calif.

[21] Appl. No.: 518,309

[22] Filed: Apr. 27, 1990

Related U.S. Application Data

[63] Continuation of Ser. No. 856,646, Apr. 25, 1986, abandoned, which is a continuation of Ser. No. 658,052, Oct. 3, 1984, Pat. No. 4,601,064, which is a continuation of Ser. No. 457,692, Jan. 13, 1983, abandoned, which is a continuation of Ser. No. 194,038, Oct. 6, 1980, abandoned.

[51] Int. Cl.$^5$ ............................................. H04B 10/10
[52] U.S. Cl. ................................ 359/154; 340/825.49; 359/142
[58] Field of Search ............ 340/311.1, 825.44, 825.47, 340/825.49, 825.59; 455/602, 603, 605–608, 617–619

[56] References Cited

U.S. PATENT DOCUMENTS

| | | | |
|---|---|---|---|
| 3,403,381 | 9/1968 | Haner | 370/93 |
| 3,478,344 | 11/1969 | Schwitzgebel et al. | 340/825.44 |
| 3,492,587 | 1/1970 | Hutton | 340/825.69 |
| 4,225,953 | 9/1980 | Simon et al. | 340/825.49 |
| 4,275,385 | 6/1981 | White | 340/825.49 |
| 4,601,064 | 7/1986 | Shipley | 455/617 |

FOREIGN PATENT DOCUMENTS 1399508  7/1975  United Kingdom ........... 340/825.49

OTHER PUBLICATIONS

Gfeller et al.—"Wireless In-House Data Communication"—Proc. of the IEEE—vol. 67, No. 11—Nov. 1979—pp. 1474–1486.

Primary Examiner—Reinhard J. Eisenzopf
Assistant Examiner—L. Van Beek
Attorney, Agent, or Firm—Flehr, Hohbach, Test, Albritton & Herbert

[57] ABSTRACT

Personnel locating system for use in a facility having a plurality of rooms having doorways therein comprised of a plurality of portable transmitters. Each of the transmitters includes a battery and each generates an infrared signal. The system also comprises a plurality of fixed receivers positioned to cover different rooms at a facility. Each room has a receiver therein positioned to accept infrared radiation from a substantial portion of the volume of the room. Each receiver is capable of sensing and storing any of the infrared signals generated by the transmitters during any time the transmitters are located anywhere in the facility including when located within a room. The system also includes apparatus for polling the receivers to determine the location of any transmitter independent of the previous location of the transmitter.

26 Claims, 8 Drawing Sheets

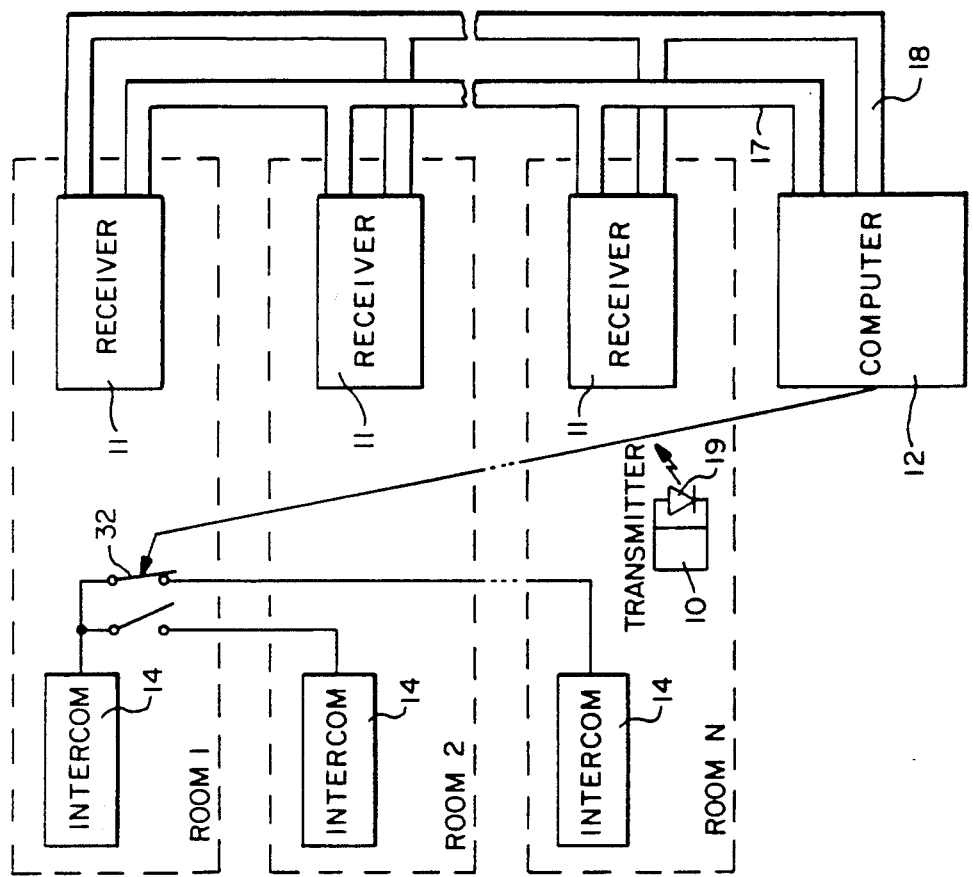
FIG.—2B
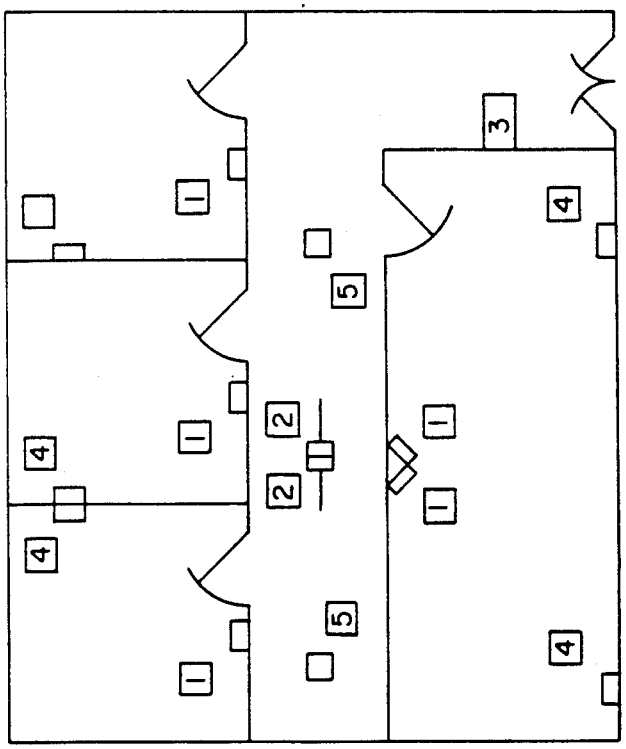
FIG.—2A
1. RECEIVER, WALL MOUNTED
2. RECEIVER, CEILING MOUNTED
3. COMPUTER, CONTROL UNIT AND DISPLAY OR INTERCOM
4. INTERCOM
5. CEILING MOUNTED SPEAKER

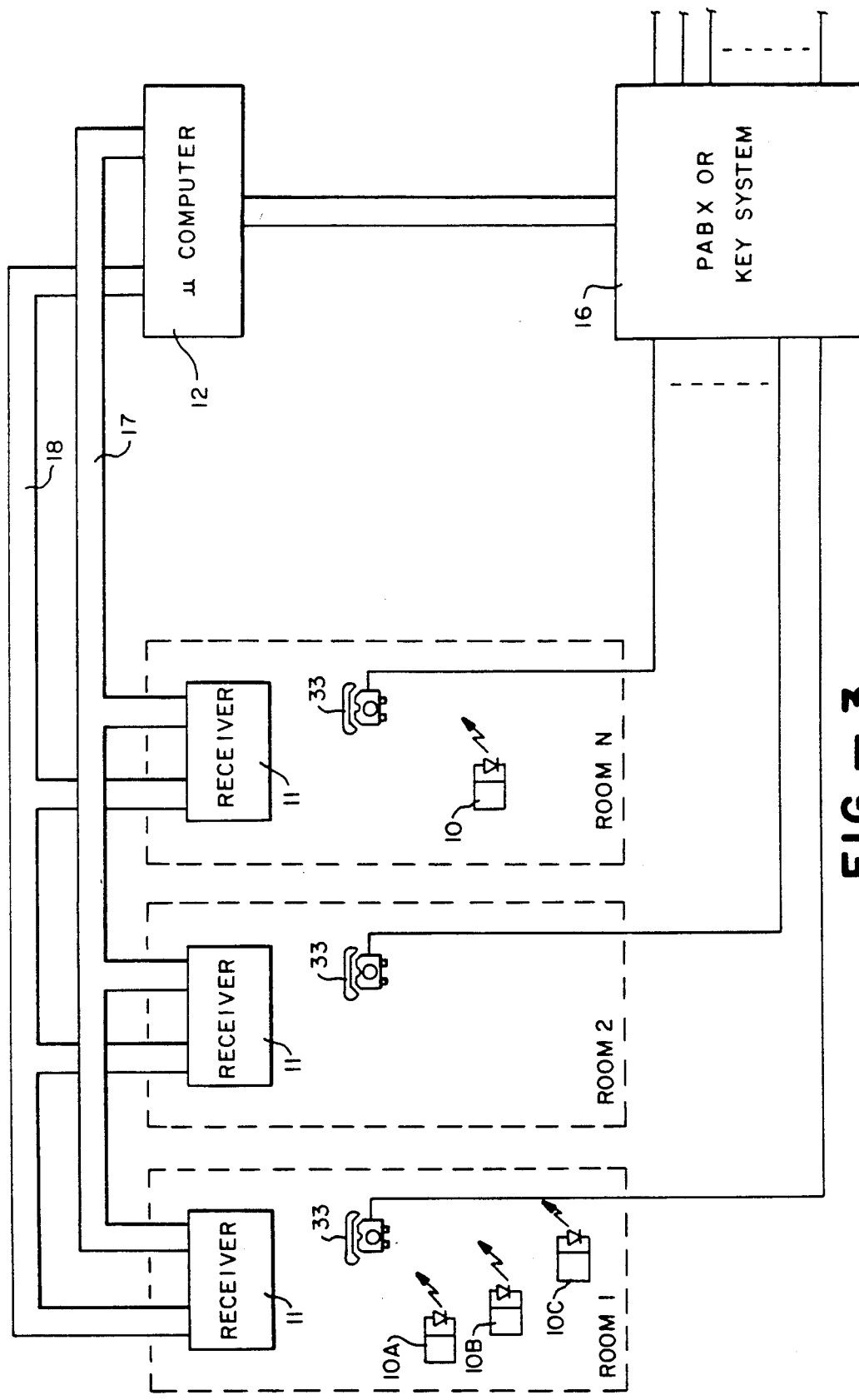
FIG.—3

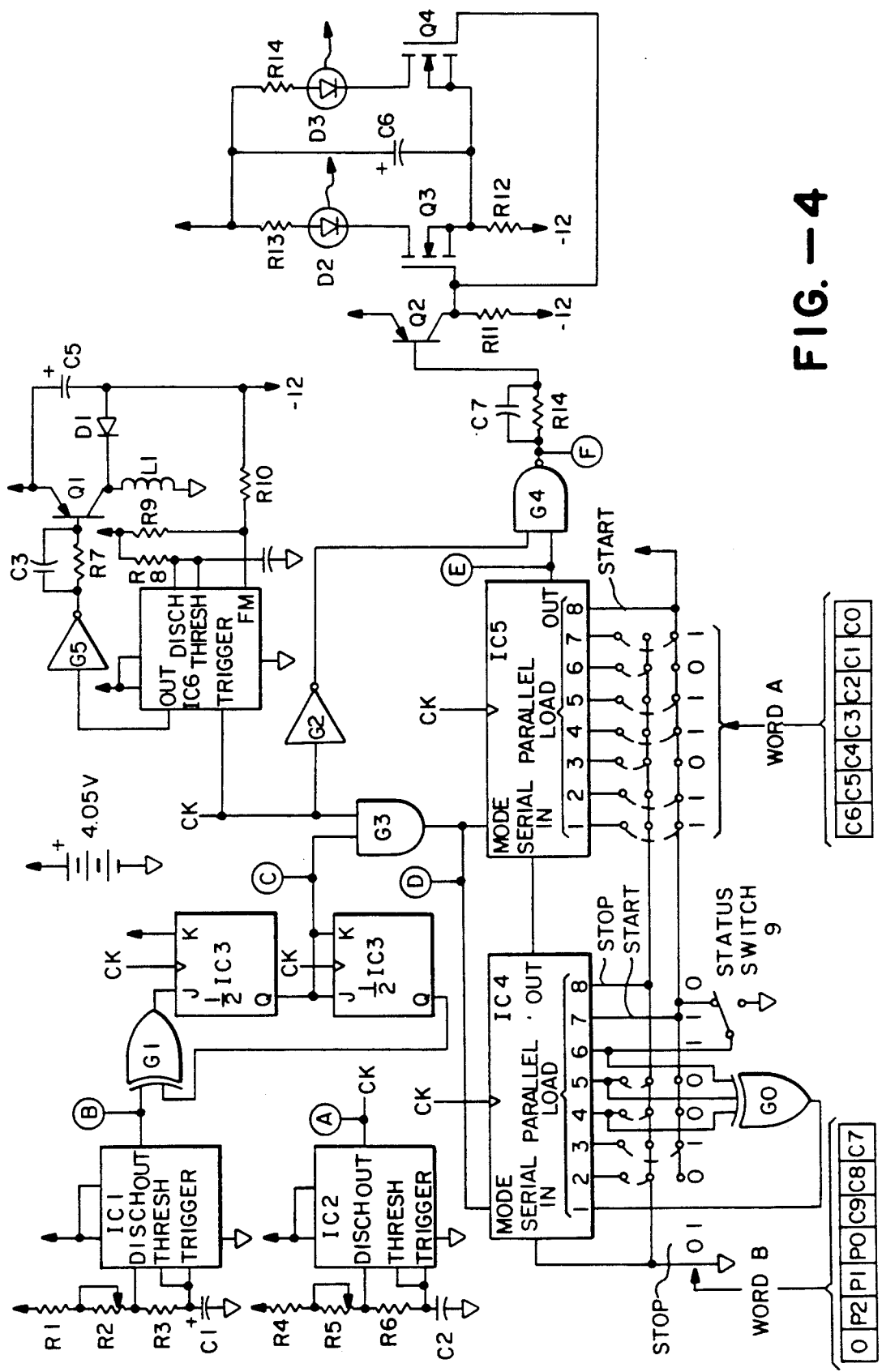
FIG.—4

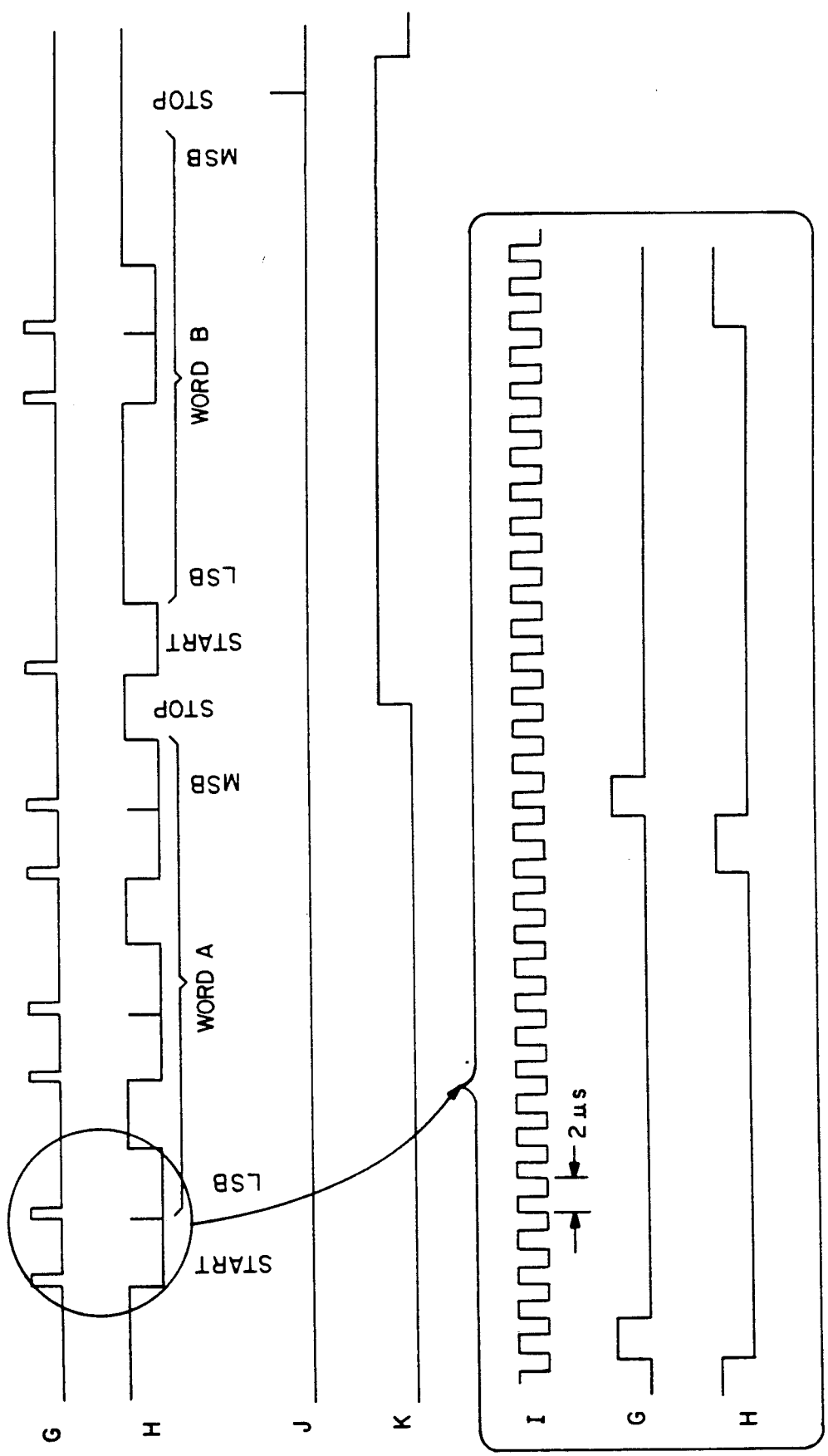
FIG.—7

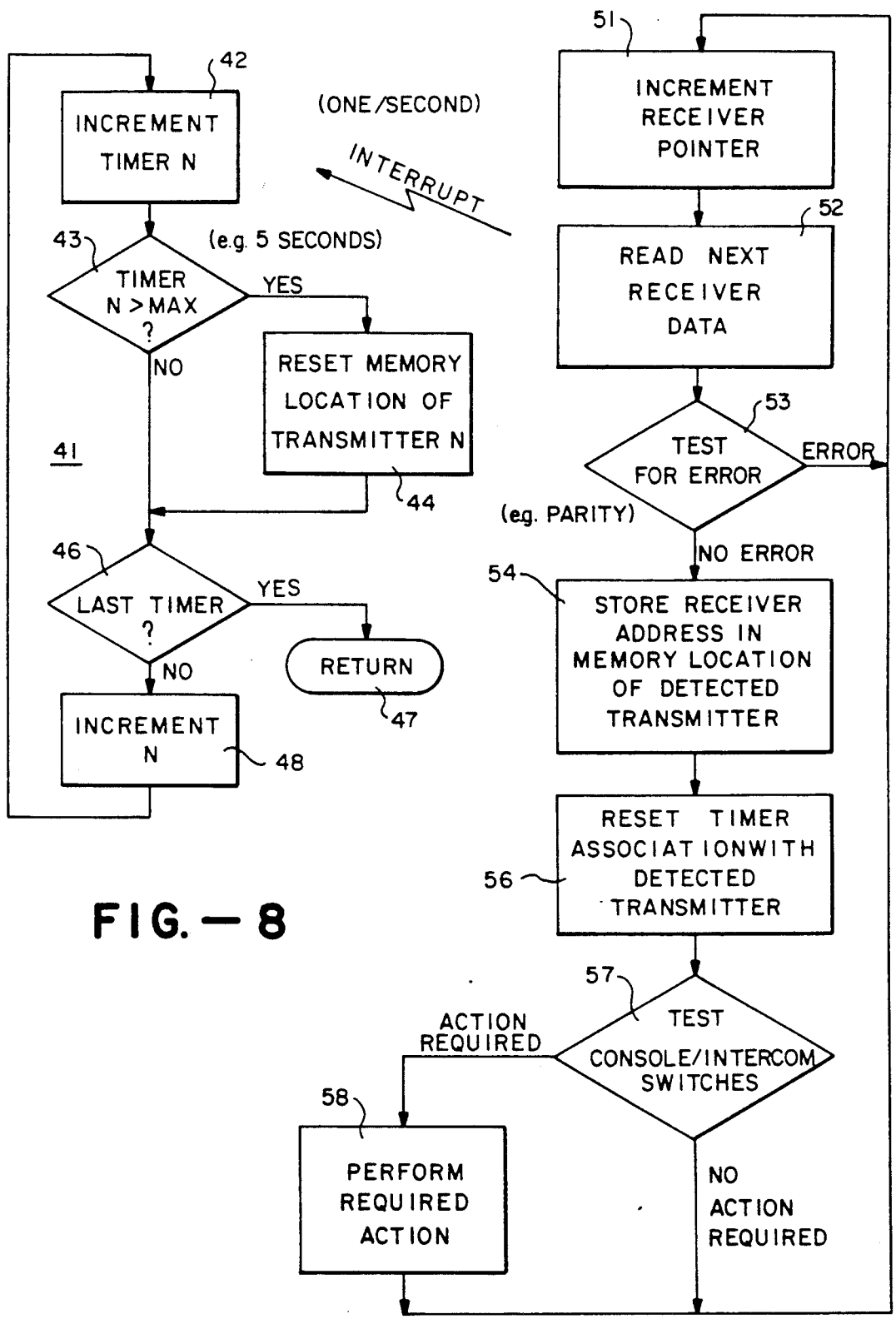
FIG.—8

COMMUNICATION SYSTEM

This is a continuation of application Ser. No. 856,646 filed Apr. 25, 1986, which is a continuation of Ser. No. 685,052 filed Oct. 3, 1984, now U.S. Pat. No. 4,601,064, which is a continuation of Ser. No. 457,692 filed Jan. 3, 1983, now abandoned, which is a continuation of Ser. No. 194,038 now abandoned.

The present invention is directed to a communications system and more particularly to a system for locating personnel at a large facility. Tied in with the location system may be a controlled intercom or a telephone system where once the person is located, communication is automatically established by one of these two systems. In addition, the system can be tied into a hospital nurse call system.

Prior systems have employed many methods for locating personnel. Pocket-page system have been used, in which voice communication is necessary to establish communication. This system has two obvious drawbacks in that it requires first, the active participation of the personnel being monitored and second, it may be a nuisance in a situation where audible disturbance is unacceptable.

Another locating system is typified by the Ward U.S. Pat. No. 3,439,320 which equips monitored individuals with ultrasonic transmitters, one for each person so equipped. Stationary receivers mounted throughout the facility detect the presence of each frequency, thus indicating the locations of all persons equipped with the transmitters. Since a tuned filter must be used in each receiver for each frequency to be detected, this type of system is limited to a very small number of transmitter identities.

As a consequence of using ultrasonic signals, since the energy consumed would be excessive if it were left on continuously, the user must key the transmitter. If this is not done, the system will, of course, not be effective.

In general, the use of ultrasonic signals presents difficulties such as echoes, susceptibility to false information from metallic noise, aerosol cans, etc. and the fact that it is relatively slow.

A modification of the Ward system employs mobile transceiver units which are interrogated by a central transmitter, the interrogation being done by radio frequency, and the portable units responding with an ultrasonic tone which is transmitted to a fixed room receiver.

This system is shown in various forms by the following four Lester U.S. Pat. Nos.: 3,696,284; 3,729,329; 3,805,227; and 3,805,265. Although various types of transmission media may be employed for the interrogation process, including radio frequencies, the response, since it must be confined to a single room, usually takes the form of an ultrasonic wave. This system suffers from the requirement that the portable units must be both receiver/transmitter (that is transceiver) and are therefore physically large and costly. With respect to all ultrasonic systems, acoustic response from the mobile units produce echoes which must be allowed to decay before the next transceiver is interrogated. The result is that a long time is required to interrogate a large number of transceivers. Information cannot be kept current and is therefore inaccurate. Infrared has never been used before as a personnel locator. It has been used to monitor a hospital patient's condition, (for example, EKG) while allowing the patient some mobility. For example, an infrared transmitter as illustrated in U.S. Pat. No. 4,151,407 is strapped to a patient's chest. EKG information is transmitted to a single dedicated receiver by a pulse position modulation type transmission.

It is a general object of the present invention to provide an improved communications system.

It is a more specific object to provide a system which requires only a miniaturized transmitter and which has low power usage.

It is another object of the invention to provide a system as above where the communications medium is noise immune, reliable, and is available to a very large number of users and locations.

In accordance with the above objects, there is provided a communications system comprising a plurality of portable transmitters each generating automatically and repetitively a unique signal consisting of pulses of infrared radiation. A plurality of fixed receivers are positioned to cover different areas of a facility, each receiver being capable of sensing and storing any of said unique signals generated by the transmitter. Means are provided for polling the receivers to determine which of the unique signals are stored by the receivers.

FIGS. 2A and 2B are diagrammatic drawings showing blocks of FIG. 1 which illustrate one specific embodiment of the invention.

FIG. 3 is a block diagram embodying the system of the present invention showing another embodiment.

FIG. 4 is a circuit schematic of an infrared transmitter used in the present invention.

FIG. 7 illustrates timing diagrams which exist in the circuit of FIG. 6.

FIG. 8 is a software flow chart used in conjunction with a microcomputer shown in FIG. 1.

Figure 1:
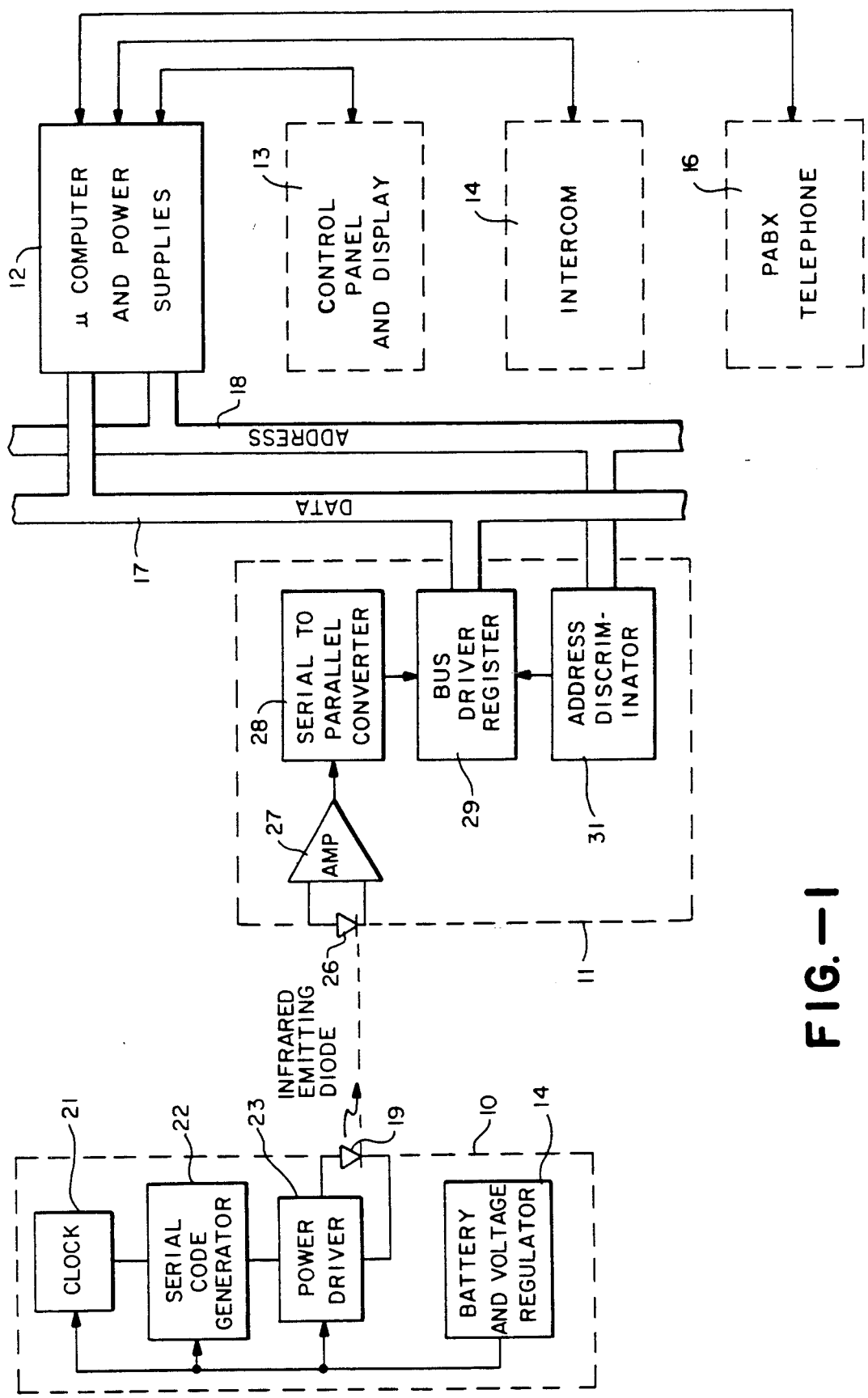
FIG. 1 is a block diagram of a communications system embodying the present invention.

FIG. 1 is a block diagram of a mobile transmitter 10. A representative stationary receiver 11 is illustrated. Each room or area of a facility would contain a receiver. Central logic and control station hardware includes a microcomputer or microprocessor 12 with suitable power supplies, control panel and display 13, intercom unit 14 and a PABX telephone unit 16.

Connecting the microcomputer 12 to receiver 11 are a data bus 17 and an address bus 18. Microcomputer 12 would, of couse, have associated with it a read-only memory (ROM) and a random access memory (RAM) to provide for program and data storage. The address bus 18 might typically consist of 9 conductors and the data bus 8 conductors so that a relatively small 20 conductor cable can be used to interconnect in parallel all of the fixed receivers to the central computer Each mobile transmitter 10 which is carried by a person to be located includes in general at least one infrared emitting diode 19 which emits a coded stream or train of infrared pulses to provide a unique signal for that particular transmitter. Several diodes may transmit simultaneously for signal dispersion and intensity. Such pulse train is generated repetitively and automatically as provided by the interval clock 21. This clock drives a serial code generator 22 to provide the unique pulse code and the final infrared pulse is provided by a power driver 23. Battery and voltage regulation unit 24 provides suitable voltages.

The fixed receiver 11 includes a photodiode 26 which receives the transmitted infrared pulses. The resulting electrical signals from the photodiode are amplified by an amplifier 27, changed from a serial to parallel format in unit 28 and then coupled on command to the data bus 17 by bus driver register 29. In addition, each receiver has a particular address and this address is located in address discriminator 31 which is connected to the address bus 18.

In operation, an operator, located at the control panel 13 and wishing to locate a certain individual, enters the name or identifying code of that person by means of an associated keyboard. The microcomputer 12 searches its memory for the location at which the associated transmitter was most recently detected and displays this result via a cathode ray tube, lamp field or other method. The microcomputer, of course, has this information since it has polled via the address bus each fixed receiver and has received the stored parallel data via the data bus 17.

FIGS. 2A and 2B show an application in which the system is used to control an intercom. In FIG. 2A there is a typical office or laboratory facility with various room and doorways shown in a simplified architectural rendering with each room of the facility including a wall mounted receiver 1 or in the case of the hallway, two ceiling mounted receivers 2. In the lobby area of the facility, there is the computer control unit and display or intercom 3. Several intercoms 4 are placed in each room and these are supplemented, for example, in the hallway area with ceiling mounted speakers 5.

FIG. 2B illustrates the specific switching arrangement for the intercom system showing rooms 1, 2 and N with intercoms 14 in each room and receivers 11 in each room. The microcomputer and associated central equipment 12 are attached to the system by data and address buses 17 and 18 as also illustrated in FIG. 1. In a typical example, assume that a person carrying a transmitter 10 is in room N the transmitter, of course, having an infrared emitting diode 19 whose unique signal is being sent to the receiver 11 in that room.

Intercom keys or code numbers are associated with individual persons, rather than with specific intercom stations. When a caller presses a key on their specific intercom or enters the code number associated with the desired party, the microcomputer finds the transmitter associated with this party (having polled previously all the receivers 11 and stored that information) and makes the appropriate audio connection to the intercom station in the room in which the transmitter is located. This is illustrated where a person in room 1 would effectively close a switch connection 32 to room N. The particular switch connection is controlled by computer 12.

FIG. 3 is another embodiment where automatic call direction for a PABX or keyed telephone system 15 is accomplished.

Here again, there is room 1, room 2 and room N. Each room has a telephone 33, a receiver 11 and in some of the rooms, persons carrying transmitters 10. Again the microcomputer 12 is connected by the address and data buses 17 and 18 to the receivers and the unique signals transmitted by any of the transmitters 10 are stored in the receivers and polled by microcomputer 12. This information is then coupled into the PABX system 16. Telephone numbers are assigned on a per person rather than a per phone basis. Incoming calls are directed by the microcomputer to the telephone nearest where the called party was most recently detected. For example, upon receiving a call for a person carrying, for example, transmitter 10B in room 1, the PBX operator enters 10B or the person's name. The microcomputer 12 finds 10B in room 1 and connects the incoming call to the phone 33 in that room.

In either of the above two schemes of PABX or intercom, the transmitter may include a switch where the unique code being transmitted is modified in a way to inform the central logic unit that the wearer, though present at that location, does not wish to be disturbed by the telephone or intercom. Such a feature would be useful in business meetings, hospitals, etc.

Referring again to FIG. 3 momentarily, it is obvious that several transmitters, for example, 10A, 10B and 10C may be located in a single room at the same time. In a situation as this, the receiver 11 located in that room randomly receives emissions from each device. Each incoming pulse string is retained until the next one arrives. In any given moment, the receiver contains the identification data of only one transmitter. Receivers 11 are polled sequentially and in an endless loop by the microcomputer 12 as will be shown in detail by the software flow chart of FIG. 8.

When a transmitted code is detected at any receiver, a software timer associated with that transmitter is reset. The timers are incremented each second on an interrupt routine. When any timer reaches a predetermined limit value of, for example, typically 5 seconds, the associated transmitter is declared absent from the system. Thus, if the unique signal provided by a particular transmitter has not been sensed in a predetermined time interval, its stored signal in the central computer memory is effectively erased. The central computer then makes note that the transmitter is absent from the system so that if any contact is sought with that transmitter this information may be utilized. The 5 second time delays allow proper operation of the system when multiple transmitters are present in the same room since as long as each transmitter is detected once in every 5 second interval, it will not be considered absent even though its presence has not been detected during a given receiver polling loop. And the rapid polling capability provided by the use of infrared ensures that all transmitters which are present will be detected.

Figure 5:
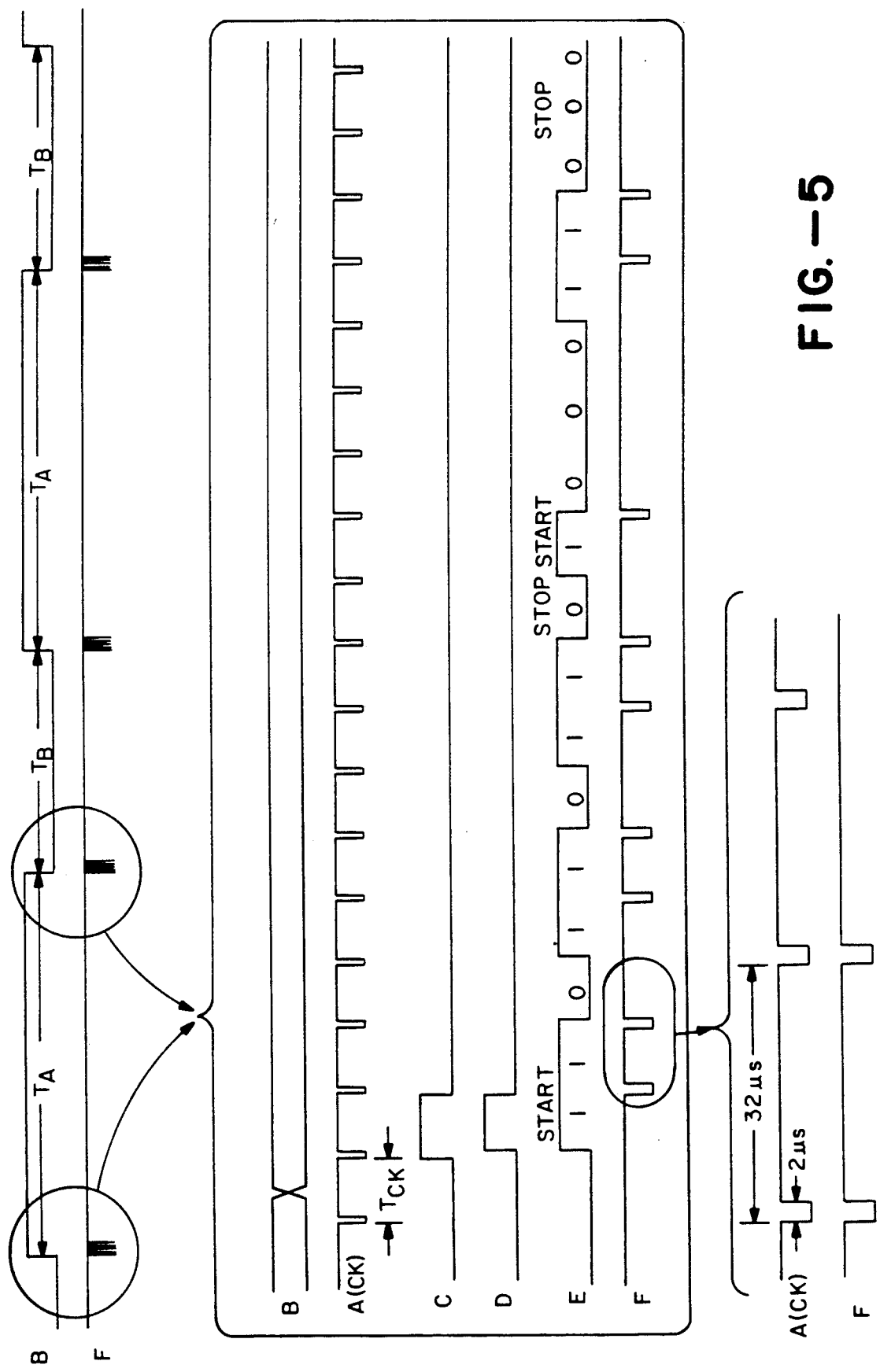
FIG. 5 shows various timing diagrams associated with the transmitter of FIG. 4.

As stated above, all the infrared transmitters are identical except for their code and a typical transmitter is shown in schematic form in FIG. 4. In addition, the circled letters on various points on the circuit relate to the similarly designated timing diagrams of FIG. 5. The scale of FIG. 5 is, of course, relative only.

The unique transmitter identification number is permanently stored in IC4 and IC5 by means of a set of 13 jumpers which are hard wired at the parallel load inputs of the IC's. This transmitter identification conforms to a two word, 7 digit per word format. As illustrated, word A consisting of bits C0 through C6 is stored in IC5 and word B in IC4. Word B consists of three more data bits, C7, C8 and C9 and three parity bits P0, P1, P2. In addition, the most significant bit of word B is always zero, since the serial input of IC4 is tied low. In addition, various stop and start bits are permanently wired as shown by the parallel load input lines 7 and 8 in IC4 and input line 8 in IC5. And a zero or 1 is indicated by the dashed jumpers, where a positive voltage (in this case 4.05 volts as shown in the drawing) is a "1" and a zero voltage is a logical "0".

Parity is computed by dividing the identity code into three sections and assigning one parity bit to each section such that each section (including parity) contains an even number of ones. For example, P0 is associated with bits C0 through C3, P1 with C4 through C6 and P2 with C7 through C9. These parity bits are checked by the microcomputer after polling each receiver as will be explained in detail in the flow chart of FIG. 8. Data not passing the parity test is discarded at this point. Use of such error detection greatly reduces the probability of data errors. In the example shown, the ten identity bits C0 through C9 still allow a total of 1024 unique transmitters.

As discussed above, in order for a wearer of a transmitter to inform the central logic unit that they do not wish to be disturbed (a status condition), a status switch 9 is provided on IC4 which switches bit C7 of word B to a logical "0". Gate G0 accommodates the change in parity. When this change in the unique signal of the transmitter is sensed, the central computer will be aware of this changed status.

This identification code in IC4 and IC5 is serially shifted out of the storage registers IC4 and IC5 when the mode input is taken low. See the waveform D of FIG. 5. When this occurs, the waveform illustrated at E of FIG. 5 is formed as data is shifted one position to the right at each positive clock transistion. Gate G4 then converts the serial bit stream into a narrow pulse format F indicated in FIG. 5. The narrow pulse output at F is accomplished by ANDING with the waveform E, a clock waveform A as illustrated in FIG. 5, and which is also designated in the drawing as CK. As will be discussed below, this narrow waveform is the key to producing high instantaneous transmitter output while maintaining low average battery drain and hence allowing the use of a small battery.

Continuing with the operation of FIG. 4, the narrow pulse train F drives the base of a transistor Q2 which translates the zero and 4 volt logic levels to the 4 and 12 volt levels necessary to drive FET's Q3 and Q4. Capacitor C6 charges during the long transmitter inactive period via R12 and provides high current pulses of typically 5 to 10 amperes during the transmit period. These current pulses drive the infrared emitting diode D2 and D3 to produce a large power output.

The clock CK pulses A are generated by IC2 which is a Model ICM 7555 CMOS timer. Resistors R4, R5, R6 and capacitor C2 control the timing. A similar timer IC1 is used to generate a dual interval waveform B (see FIG. 5) which generates pulse train or infrared pulse groups uniquely asynchronous relative to one transmitter then another. This prevents undesired synchronization overlap of the pulses of, for example, two transmitters, which might be in the same room and thus transmitting to the same receiver. If this were the situation, transmission might occur at the same instant, in which case both transmissions would be obliterated or provide inaccurate information. Thus, the transmissions of pulse groups, as shown by the timing diagram F, occur after the beginning of each or, the two intervals $T_A$ and $T_B$, as shown by the timing diagram B. And each transmitter is assigned a unique combination of $T_A$ and $T_B$ by the selection, as illustrated in FIG. 4, resistors R1 and R3 of IC1. R2 provides for trimming compensation for the tolerance of C1.

The output of IC1 which is the waveform B drives the exclusive or gate G1, which in turn drives the ganged IC3 JK flip-flops. These are dual negative edge triggered units. A pulse at point C (see FIG. 5 also) follows every transition of the waveform B. This pulse (see C FIG. 5) is the period between the clock pulses A. It is slightly narrowed before being applied to point D which is the mode input of IC4 and IC5. As discussed previously, this starts the shifting of the data out of IC4 and IC5. Such shifting occurs at the beginning of both time intervals $T_A$ and $T_B$ which are uniquely asynchronous relative to each transmitter.

The remainder of the circuit of FIG. 4 includes IC6 which is a regulated DC to DC inverter which provides both the 4.05 volts common voltage and a negative 12 volts to drive diodes D2 and D3. It operates as a pulse width modulated switching regulator.

It has been found that an ideal wavelength of infrared output radiation is 880 nanometers. This best discriminates over ambient infrared noise. Such a wavelength will be produced by, for example, a model GE F5E1 diode.

Referring still to FIG. 5, as discussed above, the key to producing high instantaneous transmitter power while maintaining low battery drain are the narrow IR pulses. While the bit time or the distance between separate infrared pulses is 32 microseconds as indicated by the A(CK) waveform, each infrared emitting diode is on for only a 2 microsecond period. Since a maximum of 15 bits may be transmitted, the maximum overall effective duty ratio is 0.003%. This is assuming a total time of $T_A$ and $T_B$ of 2 seconds. Thus, each infrared emitting diode may be safely pulsed at a high current since the pulse width is kept small. Five ampere pulses are safe for pulse width less than 4 microseconds. Average current drain, assuming 5 ampere pulses is only 5 amperes multiplied by 0.003% which is 150 microamperes. Long life can therefore be expected from a relatively small capacity battery. And in addition, the magnitude of the infrared pulses is large enough to overcome ambient infrared noise. Thus, by maintaining a duty cycle of well below 1%, a transmitter is constructable which may operate automatically and repetitively as contrasted to, for example, ultrasonic transmitters which must be actuated by the user because of their power requirements.

Figure 6:
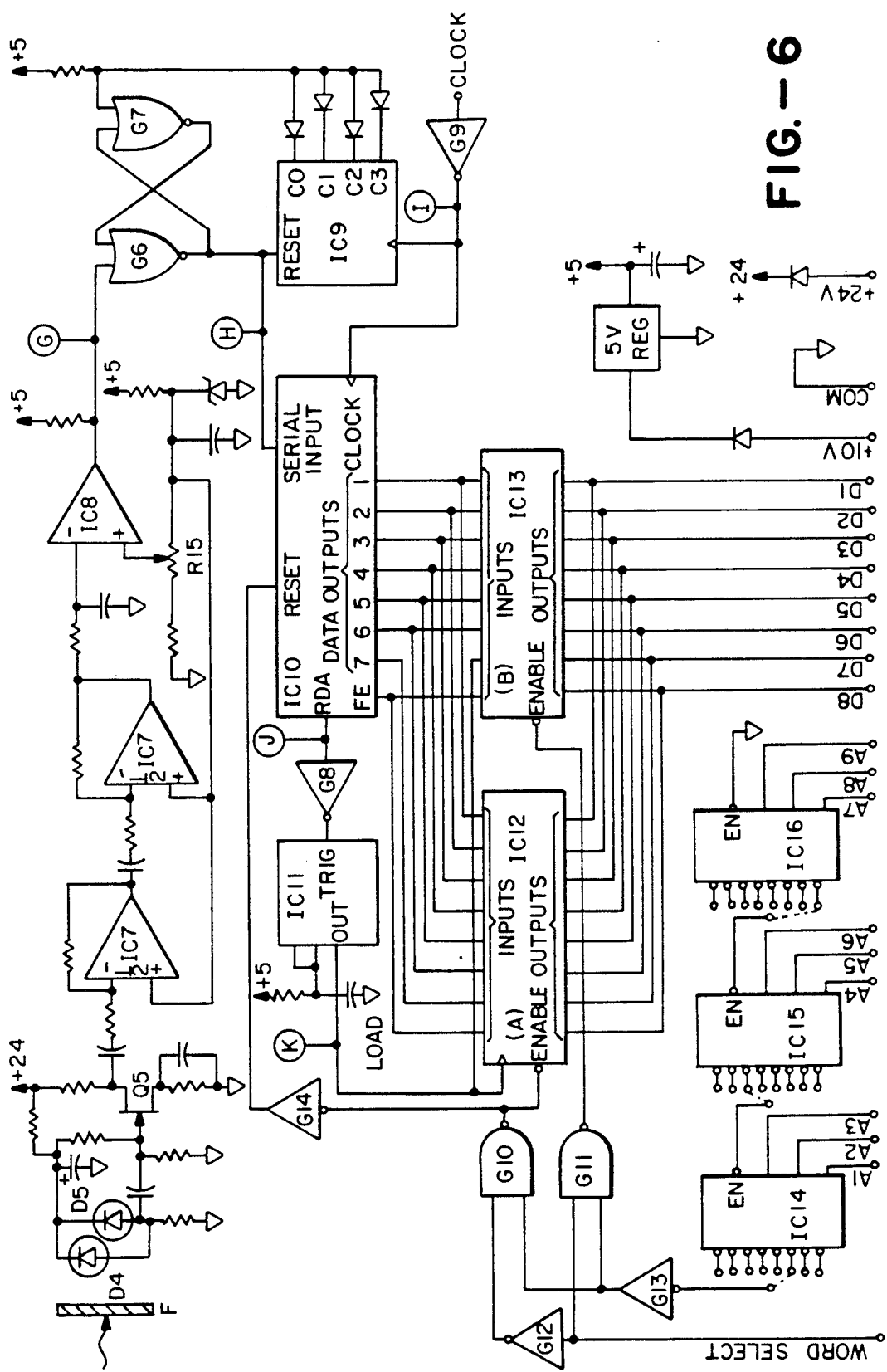
FIG. 6 is a circuit schematic of an infrared receiver used in the present invention.

A typical receiver is illustrated in FIG. 6 along with its associated timing diagrams in FIG. 7 where the letters designating the timing diagrams are circled points of the circuit schematic of FIG. 6. As illustrated in FIG. 1, there is one receiver 11 per room or area. Each receiver is coupled to the central computer 12 by data and address buses 17 and 18. Specifically referring to FIG. 6, the address bus lines are designated A1 through A9; data bus lines by D1 through D8. In addition, there is a word select line input, as indicated and a clocking input (along with suitable common and voltage supply inputs).

The incoming infrared pulse signal passes through an optical filter F which acts to filter out shorter ambient noise wavelengths which might be due to visible light and ultraviolet. Infrared pulses are detected by the photodiodes D4 and D5 which may be of either an optron type OP 915 or Ferranti type BPW 41. Q5, IC7 and associated circuits are a low noise, high-gain amplifier whose frequency response is chosen to reject 60 Hz from fluorescent and incandescent lamps. High frequency response is also controlled to limit the amplifier's noise bandwidth.

Amplifier output is applied to a comparator IC8 whose sensitivity is adjusted by means of R15. The output of comparator IC8 designated point G (see FIG. 7) is a stream of positive going pulses corresponding to the incoming infrared pulses.

This stream of narrow pulses is stretched and inverted by a digital single shot circuit made up of G6, G7 and IC9. The expanded waveforms I, G and H of FIG. 7 illustrate the operation of this part of the circuit. A pulse at G forces the G6 output low releasing the reset input of the four bit counter IC9 and setting the G6/G7 latch. In the timing diagram H is equal to zero. IC9 begins to count CLOCK pulses, which are inputed via G9 indicated at I, and when it reaches 15 C0=C1=C2=1) the latch is reset. Since the CLOCK period is 1/16th of the transmitter clock period, an incoming 2 microsecond wide pulse is stretched to almost its full bit time of 32 microseconds, as illustrated in the drawings. The serial data is now in the form required by IC10 which is a universal asynchronous receiver transmitter (UART).

The UART (which may be a Western Digital Model TR1863) interprets the first one to zero transition at the beginning of the start bit. Then it counts 8 clock pulses to find the middle of the start bit. From this point, the UART samples the input bit stream every 16 clock pulses to determine the center of each succeeding data bit. The circuit is programmed (via hard wired control input connections, not shown) to receive 7 data bits preceded by one START bit and followed by one STOP bit. As the data bits are sampled, they are latched in a buffer internal to the UART. When the entire 7 bit word has been latched and a stop bit has been detected, a short pulse is emitted from UART output RDA and the latched data appears at the data outputs of IC10. If the STOP bit is not detected where it is expected, the FE (framing error) output of the UART goes high to indicate that the data is not valid.

The pulse emitted by RDA triggers IC11 which is a type NE 555 timer, operated in the monostable (one-shot) mode. The output of IC11 immediately goes high, clocking the data present at the IC10's data outputs and the FE output into IC12. This is an 8 bit register which contains data consisting of the word A, the first 7 bit word emitted by the transmitter (although in inverted form).

The output of IC11 stays high for a period somewhat longer than 9 bit-times. During this time, however, the UART IC10 is receiving word B. When reception of word B is complete, another pulse is emitted from RDA. However, since the one-shot IC11 is still high, IC12 is not clocked again but instead retains word A.

At this point, the complete transmitted data is available; word A is contained in IC12 and word B is latched in the IC10 output buffer and appears on its data output terminals. In addition, the framing error flag (FE) for each word is available as is the one-shot output of IC11.

IC13 is an 8 bit buffer with tri-state outputs. Since word B of the transmitter contains only 6 data bits (see FIG. 4), data output 7 of IC10 is not connected to IC13. Instead, in its place is connected the output of one-shot IC11. If, when IC13 is enabled and the data present at the UART outputs is placed on the data bus (D1 through D8), the output of IC11 is high, the microcomputer will conclude that this data is not valid, since reception is not yet complete.

Each receiver is assigned a unique address, corresponding to its physical location in the facility, as selected by the three to eight line decoders IC14 through IC16. With the receiver selected, the WORD SELECT input is used to enable either IC12 or IC13 thereby placing either word A or word B data on the data bus (D1 through D8).

When IC12 is enabled, the UART IC10 outputs are reset to zero, via G14 and the IC10 reset input. This ensures that a receiver located in a vacant room does not retain the identification data of the last transmitter detected there after this data has been stored in the central computer. Thus, identification data in each receiver is erased either by polling or by reception of new identification data.

In general, the foregoing arrangement demands, that in polling each receiver, IC13 (WORD B) be enabled prior to IC12 (WORD A).

FIG. 8 is a software flow chart for the central computer 12 (see FIG. 1) and illustrates the polling function and the various timing routines discussed previously. Specifically, with each transmitter, there is associated a software timer, as shown by the loop 41 where the block 42 states Increment Timer N. N relates to a generalized transmitter ID. As indicated by the Interrupt arrow, the timers for all transmitters are incremented each second and as indicated by block 43, when a timer reaches its limit of, for example, 5 seconds, then as shown in block 44 the memory location of this transmitter is reset to effectively erase it to indicate it is absent from the system. In the remainder of this subroutine in block 46, the next transmitter is tested and the routine is finished by a return as shown at 47, or the next transmitter is incremented as shown by 48. Thus, the location data in the central computer memory is erased every 5 seconds or updated, whichever occurs first.

The general polling routine is illustrated starting at block 51 where the receiver pointer is incremented to poll in sequence each receiver. Block 52 indicates the next receiver being polled and this data is tested for errors at 53. This is the parity error test mentioned above. If there is no error, the receiver address is stored in the memory location of the detected transmitter at block 54. The timer associated with that transmitter is reset as indicated by block 56.

Finally, to accomplish any other action such as the intercom connection as discussed above in conjunction with FIG. 2B there is a routine indicated at 57, Test Console/Intercom Switches. Here either an action is performed at 58 such as closing a possible switch 32 as indicated in FIG. 2B, or no action is required.

In summary, the passive infrared locator system described above eliminates the several disadvantages of prior systems.

These include radio interference when RF frequencies are used, echoes in ultrasonic techniques, and susceptibility to false information from metallic noise. Ultrasonic systems were also affected by atmospheric conditions such as temperature, humidity and pressure which is not true of the present invention. Finally, here a large number of transmitters may be used, such as the 1024 possible in this present system. In prior systems this would be impossible. With regard to transceiver systems, they are very complicated.

Thus, the system of the present invention eliminates the above disadvantages through the introduction of two fundamental improvements: first, the use of pulses of infrared energy as the transmission medium and second, the use of portable transmitters, rather than complicated transceivers.

The use of infrared as the transmission medium has numerous advantages. IR energy behaves much like visible light and so is easily confined to a single room. Transmission paths need not be line of sight, since the energy reflects well from materials commonly used in offices, hospitals, etc.

Moreover, the use of infrared is not subject to Federal Communications Commission's regulations as are RF transmissions. Interference from other sources, which is a problem in ultrasonic systems, is greatly reduced by the use of an optical filter in the receiver. Finally, transmitter and receiver hardware is simplified due to the absence of tuned circuits and through the use of pulse code techniques.

The one way (transmit-only) operation of the present system delivers an immediate two-fold decrease in system complexity when compared with the previously described transceiver based systems. The resulting simplification of the portable unit produces a package which is smaller and less costly, two factors which are crucial to a practical system. Also, the elimination of one transmission process reduces the possibility of error, increasing the confidence level of the final data.

What is claimed is:

1. In a personnel locating system for use in a facility having a plurality of rooms having doorways therein, a plurality of portable transmitters, each including a battery and each generating an infrared signal, a plurality of receivers, each room having a wall-mounted receiver positioned within the room to accept infrared radiation from a substantial portion of the volume of the room, each receiver in each room being capable of sensing and storing any of said infrared signals generated by said transmitters during any time said transmitters are located anywhere in said each room and means for polling said receivers to determine the actual location in real time of any transmitter in use in the facility independent of the previous location said any transmitter in the facility.

2. A system as in claim 1 wherein the power in said infrared signal from each of said portable transmitters is sufficient to allow said infrared signal to be reflected off objects and off the walls of said each room and still be sensed by said receiver in said each room, said infrared signal also being of a low duty ratio to minimize energy drawing on said battery of said portable transmitter.

3. A system as in claim 2 wherein said infrared signal has a duty cycle of less than approximately 0.003%.

4. A system as in claim 1 wherein each of said receivers includes optical filter means for filtering out visible light and ultraviolet energy and additional electrical filter means for controlling high frequency response.

5. A system as in claim 1 wherein each of said receivers include means for storing at least one infrared.

6. A system as in claim 1 where the infrared signal includes an error detection code.

7. A system as in claim 1 wherein said transmitter transmits its unique signal with a unique transmit interval which is not a multiple of another transmit interval whereby the collision of signals from said transmitters will occur infrequently.

8. A system as in claim 1 wherein said infrared radiation has a wavelength of substantially 880 nanometers.

9. A system as in claim 1 wherein each receiver has a unique location address corresponding to said area in said facility in which it is located, and wherein said polling means also includes means for polling said receivers for said location addresses.

10. A system as in claim 9 wherein said polling means includes a central computer having a memory in which there is stored said location addresses of said receivers and the infrared signals associated with said transmitters.

11. A system as in claim 10 together with means for erasing said memory if it has not been updated within a predetermined time interval.

12. A system as in claim 1 together with means for determining and recording the absence from the system of a said infrared signal if said infrared signal has not been sensed within a predetermined time interval.

13. A system as in claim 1 together with telecommunication means for automatically establishing an audio connection to at least certain of said rooms in said facility.

14. A system as in claim 1 wherein each transmitter includes means operable by the personnel for altering the infrared signal to indicate a preselected condition.

15. A system as in claim 1 wherein said means for polling continuously senses, on a cyclic basis, which of said unique pulsed infrared signals are stored at said receivers.

16. In a method for locating personnel using infrared energy and for installation in premises including a plurality of rooms defined by walls impermeable to infrared energy and providing surfaces for reflecting infrared energy therefrom and having entrances through which personnel can pass by the use of a plurality of portable battery powered infrared transmitters with each transmitter emitting infrared energy and a plurality of infrared receivers, the method comprising the steps of causing each of the personnel to be located to carry an assigned transmitter, positioning one of said infrared receivers in each room on the wall of the room to accept infrared radiation from a substantial portion of the volume of said each room and so that it is capable of receiving infrared energy emitted by any of said infrared transmitters in said each room either directly by line-of-sight or by reflection from surfaces of objects in said each room or from surfaces of the walls of said each room, polling said plurality of receivers, utilizing the information obtained by polling said plurality of receivers for ascertaining the actual location in real time and identity of any transmitters in said each room independent of the previous locations of said transmitters in said each room.

17. A method as in claim 16 wherein the infrared signal is of sufficient power so that when it is reflected by surfaces of objects in the room and/or surfaces of walls of the room it can still be sensed by the receiver in said each room.

18. A method as in claim 17 wherein the infrared signal is generated with a low duty cycle to minimize power requirements.

19. In a personnel locating system of the type utilizing infrared energy and for installation in premises including a plurality of separate rooms defined by walls impermeable to infrared energy and providing surfaces for reflecting energy, the rooms having entrances thereto through which personnel can pass, a plurality of portable battery powered infrared transmitters, each transmitter having circuitry for emitting infrared energy to provide infrared signals at transmit intervals, said transmitters being of a size so that an assigned transmitter can be carried by each of the personnel, a plurality of infrared receivers, each of the rooms in the premises having a wall-mount infrared receiver therein exposed to the interior of the room positioned to accept infrared radiation from a substantial portion of the room, the receiver in said each room being capable of receiving infrared energy emitted by any infrared transmitter in the room either directly from the transmitter by line-of-sight and/or by reflection from the surfaces of the objects in said each room and/or from surfaces of the walls of said each room, each receiver having an ascertainable address, a control console and means establishing communication with each receiver in the system and the console, said console having associated therewith a computer memory for receiving and storing information received from the receivers, said control console including means for polling said receivers and for storing information in the computer memory, said control console having means associated therewith for indicating the actual location and identity of each transmitter by utilizing the information in the computer memory, said control console having means associated therewith for indicating the actual location and identify of each transmitter by utilizing the information obtained by polling the receivers by having each transmitter transmit at sufficiently frequent intervals and conduct polling at sufficiently frequent intervals whereby the location and identify of any transmitter in said each room is ascertained continuously and accurately independent of the previous location of said any transmitter in relationship to a two second time interval.

20. A system as in claim 19 wherein said control console includes means for erasing the information in said memory with respect to any transmitter if the information with respect to that transmitter has not been updated within a predetermined time interval.

21. A system as in claim 19 wherein said control console includes means for recording the absence of a transmitter if a signal from the transmitter has not been sensed by a receiver within a predetermined interval.

22. A system as in claim 19 together with a telephone located in at least certain rooms and means associated with the control console for selectively ringing the telephone most closely adjacent to a predetermined transmitter.

23. A system as in claim 19 wherein said infrared signals have a duty cycle at least an order of magnitude less than one percent.

24. A system as in claim 19 wherein each transmitter transmits its signal with a unique transmit interval which is not a multiple of the transmit interval of another transmitter.

25. A system as in claim 19 wherein the receivers are polled sequentially in an endless loop.

26. In a personnel locating system for use in a facility having a plurality of rooms defined by walls and having doorways therein, a plurality of portable transmitters, each including a battery and each generating an infrared signal at transmit intervals, each of personnel carrying one of said transmitters, a plurality of infrared receivers each room having a receiver therein within the confines of the walls defining said each room and exposed to the interior of said each room for receiving infrared energy from anywhere in said each room, each receiver in said each room being capable of sensing and storing any of said infrared signals generated by any of said transmitters located within said each room and means for polling said receivers in the facility, each of said transmitters transmitting at sufficiently frequent intervals and said means for polling said receivers polling at sufficiently frequent intervals to provide an effectively continuous and accurate location of said plurality of transmitters.

* * * * *

UNITED STATES PATENT AND TRADEMARK OFFICE
CERTIFICATE OF CORRECTION

PATENT NO. : 5,062,151
DATED : October 29, 1991
INVENTOR(S) : ROBERT T. SHIPLEY

It is certified that error appears in the above—identified patent and that said Letters Patent is hereby corrected as shown below:

Claim 1, column 9, line 36, before "said any transmitter", insert --of--.

Claim 5, column 9, line 52, after "one infrared" at the end of the sentence, insert --signal--.

Claim 26, column 12, line 21, after "each of", insert --the--.

Signed and Sealed this

Twenty-ninth Day of June, 1993

Attest:

MICHAEL K. KIRK

Attesting Officer

Acting Commissioner of Patents and Trademarks